Sept. 9, 1969     G. E. COX ET AL     3,465,667
APPARATUS FOR HEATING SELF-CONTAINED
POPCORN CONTAINERS
Filed March 18, 1968

INVENTORS.
Gerald E. Cox,
Donald Edward Krup
By: Charles H. Redman
Atty.

United States Patent Office 3,465,667
Patented Sept. 9, 1969

3,465,667
APPARATUS FOR HEATING SELF-CONTAINED POPCORN CONTAINERS
Gerald E. Cox and Donald Edward Krup, Elgin, Ill., assignors to Therm-Appliance Mfg. Co., Inc., St. Charles, Ill., a corporation of Illinois
Filed Mar. 18, 1968, Ser. No. 713,829
Int. Cl. A23l 1/18
U.S. Cl. 99—238.3      10 Claims

ABSTRACT OF THE DISCLOSURE

Apparatus for heating a self-contained popcorn container and the like, which includes means to shake the container while heating same and means to shut off the current to the heater element and to lift the container off of the heater element when heating is terminated.

The invention relates to improvements in apparatus for heating self-contained popcorn containers, and is more particularly concerned with electrical heating apparatus including means to automatically cut off electric current to the heater element and to shaker means therein, and to lift the container clear of the heater element when the contents of the container is "popped."

The structure includes a frame or housing assembly including a heater element and motor drive means to shake a container of popcorn placed thereon. It also includes novel linkage operable to lift the container off the heater element and to trip the switch in the circuit to the motor and heater element when "popping" is completed.

It is, therefore, an object of the invention to provide apparatus of the character referred to herein.

Another object of the invention is to provide, in apparatus of the character referred to, means responsive to completion of a cooking phase to shut off the electric current to a heater element.

Another object is to provide novel means for closing an electric circuit and for maintaining it closed for a predetermined period of time.

Another object is to provide novel means to lift an article off of a heater element after the article has been cooked.

Another object is to provide apparatus of the character referred to which is not expensive or difficult to manufacture, and one that is very efficient in use.

The structure by means of which the above noted and other objects and advantages of the invention are attained will be described in the following specification, taken in conjunction with the accompanying drawings, showing a perferred illustrative embodiment of the invention, in which.

Figure 1:
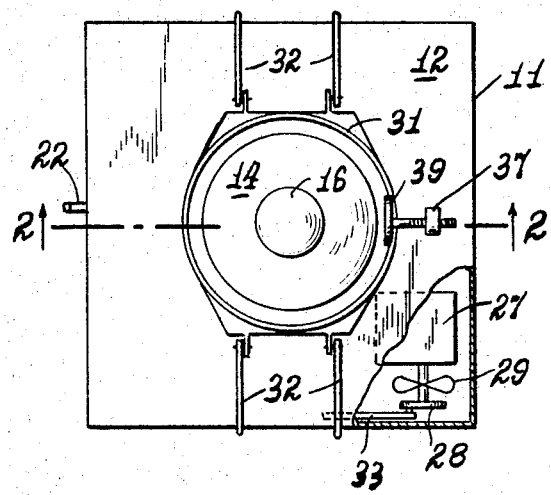
FIG. 1 is a top plan view of the apparatus, showing part of the housing top wall broken away.

Referring to the disclosure of the apparatus as shown in the accompanying drawings, the apparatus includes a deep, substantially square housing 11 including a top wall 12 having a centrally located spill pan 13 therein. A circular electric heating element 14 is arranged in the spill pan 13 and it is axially apertured to receive a rod 15 for free sliding therethrough. The upper end of this rod carries a circular plate 16 and its lower end is connected to a locking lever 17. Normally this plate is held in the elevated position shown. The lever 17 is pivotally secured to the housing at one end, as at 18, and carries on its free end a latch engaging member 19. The lever 17 is operably connected, as by loose pivotal connector 21, to a trigger bar 22 that is pivotally secured at one of its ends in the housing, as at 23, and has its free end projecting out of the housing side wall for manual digital engagement.

The locking lever 17 carries a pressure shoe 24 that is normally held spaced above the operating detent 25 of a normally open switch 26. The switch is connected in the electrical circuit to the electric heater plate 14 and to an electric motor 27. As shown, the motor 27 carries, on its shaft, an eccentric 28 and a cooling fan 29.

Arranged above the spill pan 13 is a shaker ring 31 that is loosely connected to the upper end of each of a plurality of arms 32, the lower ends of which are anchored firmly to the lower extremity of the housing. One of these arms is operably connected, as by a link 33, to the eccentric 28 so that when the motor is operating the shaker ring is vibrated in a horizontal plane.

Figure 4:
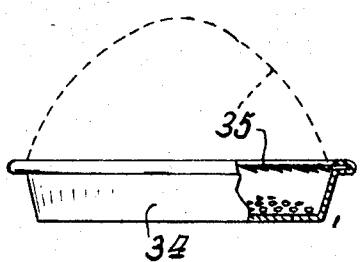
FIG. 4 is a side elevational view of a self-contained popcorn container, showing it partly in section.
Figure 5:
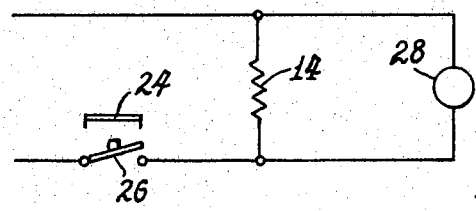
FIG. 5 is a schematic drawing of the electric circuitry.
Figure 2:
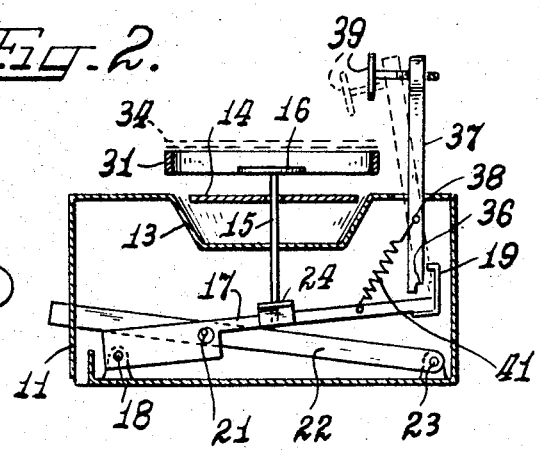
FIG. 2 is a vertical sectional view taken substantially on line 2—2 of FIG. 1, showing the container thereon in dotted lines.
Figure 3:
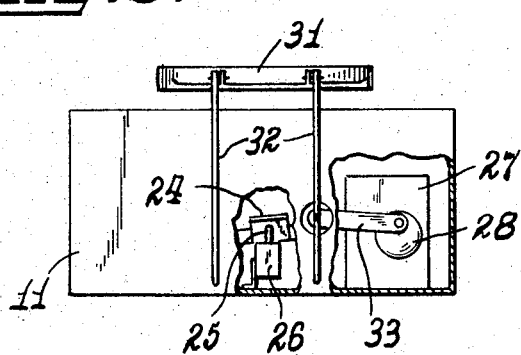
FIG. 3 is a side elevational view, showing parts of the housing broken away.

In operation, a container 34 (FIG. 4) containing popping corn, and having an expandable covering film 35, is seated on the plate 16. The lever 22 is then depressed to draw the plate 16 downwardly substantially into the plane of the heater element and within the shaker ring 31. When so depressed, the container rests within the shaker ring and sets closely over the heater element. Depressing the lever 22 closes switch 26 to start the motor and supply current to the heater. The lever 22 is held depressed by engagement with the latch engaging member 19 of a detent shoulder 36 on the lower end of an arm 37 pivotally mounted in the housing at 38. The arm extends above and is now inclined in the direction of the container, as shown in dotted lines in FIG. 2, and it carries an adjustable sensor plate 39, now disposed in a position to be engaged by the expanding covering film 35 of the container when the corn therein is popped. The expanded position of the film is illustrated in dotted lines in FIG. 4. This contact pushes the arm 37 into an upright position, disengaging the detent shoulder from the latch engaging member 19. A spring 41 then pulls the lever 17 and trigger bar 22 upwardly into their initial start positions to open the switch 26 and cut off current to the motor and heater. At the same time the plate 16 is raised to lift the container off the heater element to prevent overcooking.

We claim:

1. Apparatus for heating and cooking popcorn in a self-contained popcorn container having an expansible cover, said device comprising a housing, a heater element over which said container is arranged, shaker means engageable with the container, means operable to vibrate said shaker means, an electric circuit for said heater element and said operable means, a normally open switch in said circuit, means operable to close said switch, means actuate when the cooking is completed to open said switch, and means effective when said switch is opened to lift the container from the heater element.

2. The apparatus recited in claim 1, in which the shaker means comprises a ring disposed to surround the container.

3. The apparatus recited in claim 1, in which the means to close the switch comprises an articulated lever assembly.

4. The apparatus recited in claim 3, in which the means to lift the container is operably connected to the articulated lever assembly.

5. The apparatus recited in claim 1, in which latch means is provided to hold the switch in closed position.

6. The apparatus recited in claim 5, in which the latch means is released upon engagement therewith by the expansible cover of the container.

7. The apparatus recited in claim 5, in which the latch means is comprised of an arm and an adjustable sensor pad on said arm engageable by the expansible cover of the container.

8. The apparatus recited in claim 1, in which the heater element is arranged on the top surface of the housing, the shaker means comprises a ring surrounding the heater element, arms to support the said ring in position, and driven eccentric means connected to at least one of said arms.

9. The apparatus recited in claim 1, in which a spill-over pan is arranged beneath the heater element.

10. The apparatus recited in claim 1, in which the means to lift the container from the heater element comprises a vertically reciprocable plate disposed to underlie the container.

References Cited
UNITED STATES PATENTS

| | | |
|---|---|---|
| 2,673,806 | 3/1954 | Colman. |
| 3,087,413 | 4/1963 | Burroughs. |
| 3,359,886 | 12/1967 | Dunn. |

ROBERT W. JENKINS, Primary Examiner